US006462644B1

(12) United States Patent
Howell et al.

(10) Patent No.: US 6,462,644 B1
(45) Date of Patent: Oct. 8, 2002

(54) NETWORK OF VENDING MACHINES CONNECTED INTERACTIVELY TO DATA-BASE BUILDING HOST

(75) Inventors: Thomas P. Howell, Suwanee, GA (US); Kevin Ward, Charles, MO (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/195,415

(22) Filed: Nov. 19, 1998

(51) Int. Cl.[7] ................................................. G06F 7/04
(52) U.S. Cl. .................. 340/5.92; 340/5.9; 364/479.01; 379/102; 379/106.01; 455/66; 455/422; 700/231; 700/239
(58) Field of Search ............................... 340/5.9, 5.92; 364/479.01; 379/102, 106.01; 700/231, 239; 455/66, 422

(56) References Cited

U.S. PATENT DOCUMENTS

| 4,306,219 A | 12/1981 | Main et al. ............. 340/825.54 |
| 4,366,481 A | 12/1982 | Main et al. ............. 340/825.54 |
| 4,412,292 A | 10/1983 | Sedam et al. ................. 364/479 |
| 4,766,548 A | 8/1988 | Cedrone et al. ............. 364/479 |
| 5,091,713 A | 2/1992 | Horne et al. ................. 340/541 |
| 5,142,694 A | 8/1992 | Jackson et al. ............. 455/67.1 |
| 5,207,784 A | 5/1993 | Schwartzendruber .......... 211/6 |
| 5,319,754 A | * 6/1994 | Meinecke et al. ........... 395/325 |
| 5,526,257 A | * 6/1996 | Lerner ........................ 364/401 |
| 5,546,444 A | 8/1996 | Roach, Jr. et al. ............. 379/59 |
| 5,608,643 A | 3/1997 | Wichter et al. ......... 364/479.14 |
| 5,616,899 A | * 4/1997 | Recigno ...................... 235/375 |
| 5,734,823 A | * 3/1998 | Saigh et al. ............. 395/200.06 |
| 5,844,808 A | * 12/1998 | Konsmo et al. ........ 364/479.14 |

FOREIGN PATENT DOCUMENTS

| CA | 1296427 | 2/1992 |
| WO | WO 97/28510 | * 8/1997 |

OTHER PUBLICATIONS

Schildt, Advanced C, McGraw–Hill, pp 50–56, 1988.*

* cited by examiner

Primary Examiner—Michael Horabik
Assistant Examiner—M Shimizu
(74) Attorney, Agent, or Firm—Finnegan, Henderson, Farabow, Garrett & Dunner, L.L.P.

(57) ABSTRACT

A wide area network (WAN) of vending machines connected to a host that builds a database of vending-related information received from the vending machines. Also, a communications system within each vending machine having a vending machine data acquisition unit and a multiple-communication-technology adapter to interface the data acquisition unit to multiple communication technologies including at least one wireless technology. Also, a data structure used to build the database, the data structure having data elements corresponding to an identity of a machine, recent and previous prediction information for the machine, and recent and previous refill-visit information for the machine, the elements being linked together. The multiple vending machines communicate with a communications concentrator via one of many communication technologies. The communications concentrator interfaces the multiple vending machines to a data warehouse that builds a database using the data structure mentioned above. The data warehouse is made available to one or more bottlers for analysis of individual vending machine routing needs and profitability.

23 Claims, 13 Drawing Sheets

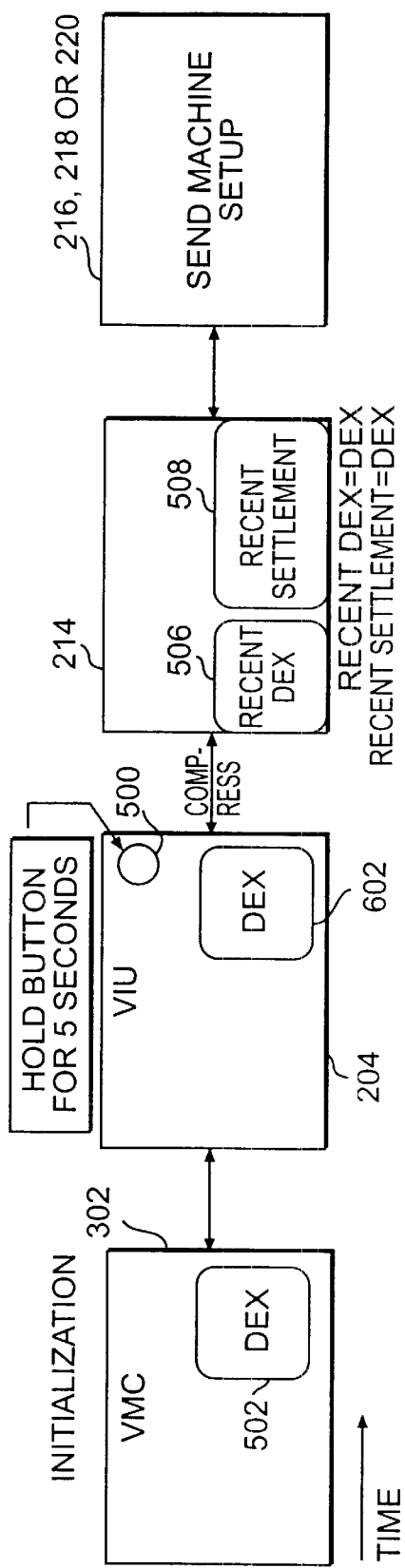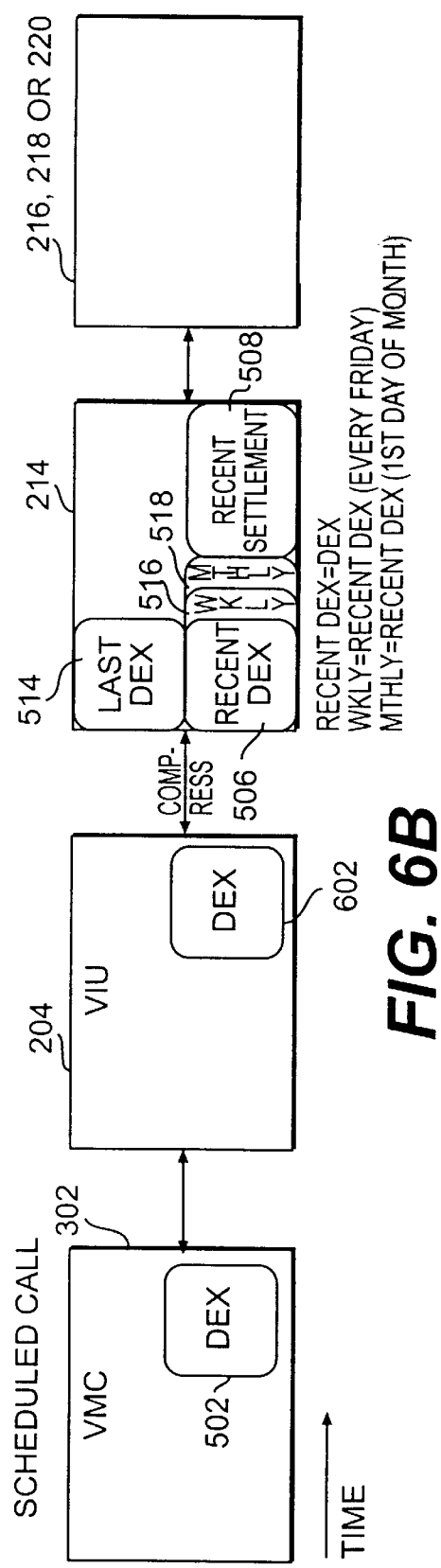

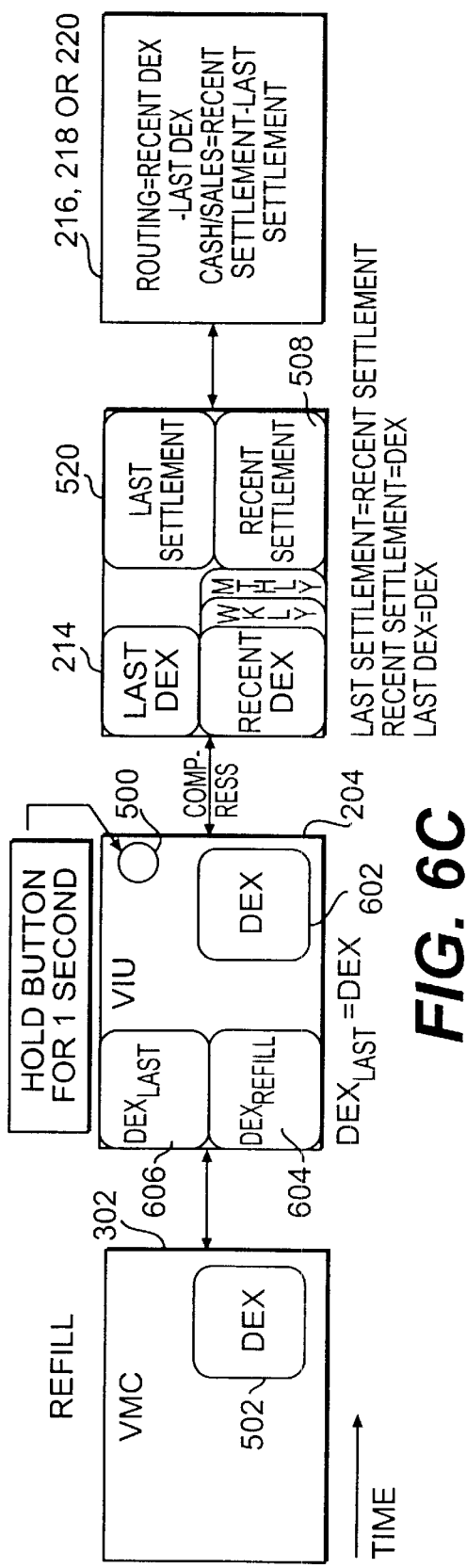

FILE REQUIREMENTS

DEX         1
$DEX_{LAST}$    1
$DEX_{REFILL}$  1/3
            ===
            2 1/3

FIG. 6E

NETWORK OF VENDING MACHINES CONNECTED INTERACTIVELY TO DATABASE BUILDING HOST

FIELD OF THE INVENTION

The invention is directed to a wide area network (WAN) of vending machines connected to a host, and more particularly to such a network in which the host builds a database of vending-related information received by the host from the vending machines, respectively.

BACKGROUND OF THE INVENTION

Vending machines, particularly soft drink vending machines, are well known. Typically, such soft drink vending machines are owned by the bottlers who bottle the soft drink. Together, several bottlers typically own hundreds of thousands of vending machines.

The inventories in bottled/canned soft drinks, as well as different denominations of coins (for the purposes of making change), in a vending machine are exhausted at rates that depend very heavily upon the location of the vending machine and the time of the year. For example, more soft drink is consumed in the hot summer months than in the cold winter months.

For a long time, bottlers would schedule regular visits to a vending machine based upon the experience of the bottler. The service person would only discover the actual degree to which the inventories had been depleted when he opened the machine to restock it. This was an inefficient system because there were many times that the service person visited a machine whose inventory was barely depleted, thus wasting the cost of a service call. Other times, a service person would discover that one or more of the inventories in a machine were completely depleted, indicating that this machine should have been serviced much sooner in order to avoid lost sales due to the completely depleted inventories. Moreover, there was no way to determine how long the greatly depleted state of the inventories had existed.

As a way to more rigorously analyze the vending patterns of a particular machine, a system was developed by which a service person would connect a data collection unit to the vending machine during the service call. When the service person returned to the bottler, this data was downloaded to a host computer where it was analyzed. While an improvement, the states of the inventories in a vending machine remained unknown until the service person opened the machine. This system, based upon hand-held data recover units, could not monitor vending activity in real time.

An improvement upon this system was developed by The Harvest Corporation of New Zealand (hereafter the Harvest System) and is depicted in FIG. 1, which includes: a plurality of vending machines 102 (only one of which is depicted for simplicity); a plurality of controller interfaces 104 (only one of which is depicted for simplicity; the interface 104 being depicted outside, but typically located inside, a corresponding-vending machine 102); a public switched telephone network (PSTN) 106; a circuit-switched cellular network (CSCN) 108; a data warehouse 110; and a plurality of bottlers' computers 112, 114 and 116.

This system of FIG. 1 connects a plurality of vending machines 102 to a data warehouse 110 via either the PSTN 106 or the CSCN 108. Each communications interface 104 connects exclusively to the PSTN 106 or the CSCN 108. In addition, the data warehouse 110 is a centralized data storage facility for the bottler, who accesses this data by remotely connecting his computer 112, 114 or 116 to the data warehouse 110. The bottler's computer 112, 114 or 116 contains software to analyze the vending patterns hidden in the raw vending-related data stored in the database created by the data warehouse 110. The organization of the data in the data warehouse appears to be proprietary.

At first, the Harvest system communicated only via a PSTN 106, so it used only a single-communication-technology interface. Then, it was upgraded to also communicate via a CSCN 108. It is noted that this prior art responded to changes in the communication technology (from PSTN to CSCN) by developing a new single-communication-technology interface 104. Again, a single-communication-technology interface 104 can be connected to the PSTN 106 or a CSCN 108, but not both. In other words, the prior art responded to a request to use an alternative communications technology by designing a new single-communication-technology interface 104 for the vending machine 102. The new single-communication-technology interface 104 replaced the existing single-communication-technology interface 104 in a vending machine 102 for which the use of an alternate communications technology was desired.

In the Harvest system, when it is desired to switch a vending machine 102 from using PSTN 106 to using a CSCN 108, it is necessary to replace the dedicated PSTN interface 104 in the vending machine with a dedicated CSCN interface 104. This is not a simple matter, which tends to retard the likelihood that such a switch would be made.

SUMMARY OF THE INVENTION

The invention represents, among other things, a recognition that alternate communication technologies exist in a given area and that it may be desirable from time to time to easily change the communication technology being used by one or more, but not necessarily all, of the vending machines owned by a bottler.

The invention also represents, among other things, a recognition that there is an efficient way to communicate vending-related data from the vending machine to a data warehouse that minimizes the expense of establishing a remote connection.

The invention also represents, among other things, a recognition that the database can be built using a data structure that efficiently organizes the information in terms of the needs of one or more bottlers.

The invention, among other things, provides a vending machine communication system comprising: a vending machine data acquisition unit to collect vending-related data concerning said vending machine; and a multiple-communication-technology adapter to interface said data acquisition unit to a plurality of communication technologies including a first wireless technology.

The invention, among other things, also provides a vending machine monitoring system comprising: a plurality of vending machines, each vending machine having a communication system that includes a vending machine data acquisition unit for collecting vending-related data concerning said vending machine; a multiple-communication-technology adapter to interface said data acquisition unit to a plurality of communication technologies including a first wireless technology, said adapter preferably including a modem; and a dedicated terminal unit of one of a plurality of communication technologies, said dedicated terminal unit being operable to connect said modem to a network operating according to said one of said plurality of communication technologies; a first network operating according to a first one of said plurality of communication technologies; a second network operating according to a second one of said plurality of communication technologies; a communications concentrator, connected to said first and second networks, for communicating with each said data acquisition unit via said modem and one of said first and second networks, respectively; a data warehouse unit for building a database that includes data corresponding to each of said vending machines; and a data processor for analyzing said data stored in said database.

The invention, among other things, also provides a memory for storing, vending machine-related data, corresponding to a plurality of vending machines managed by a manager, that is to be managed for access by an application program being executed on a data processing system of said manager. This memory includes data structures, and each such data structure has: a first data element for storing an identification of one of said vending machines; a second data element, associated with said first data element, for storing a most recent set of prediction information about said one of said vending machines; a third data element, associated with said first data element, for storing a next most recent set of prediction information about said one of said vending machines; a fourth data element, associated with said first data element, for storing a most recent set of refill-visit information for said one of said vending machines; and a fifth data element, associated with said first data element, for storing a next most recent set of refill-visit information for said one of said vending machines.

The invention, among other things, also provides a vending machine monitoring system comprising: a plurality of vending machines; a wide area network for connecting said plurality of vending machines to a communications concentrator; said communications concentrator for communicating with each of said plurality of vending machines, respectively and a data warehouse unit. The data warehouse unit builds a database that contains data corresponding to each of said vending machines. The data warehouse uses the data structure discussed above to build the database.

The present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention and wherein

FIGS. 6A–6E depict alternative on-line data transmissions scenarios according to the invention.

DETAILED DESCRIPTION OF THE DETAILED EMBODIMENTS

Figure 1:
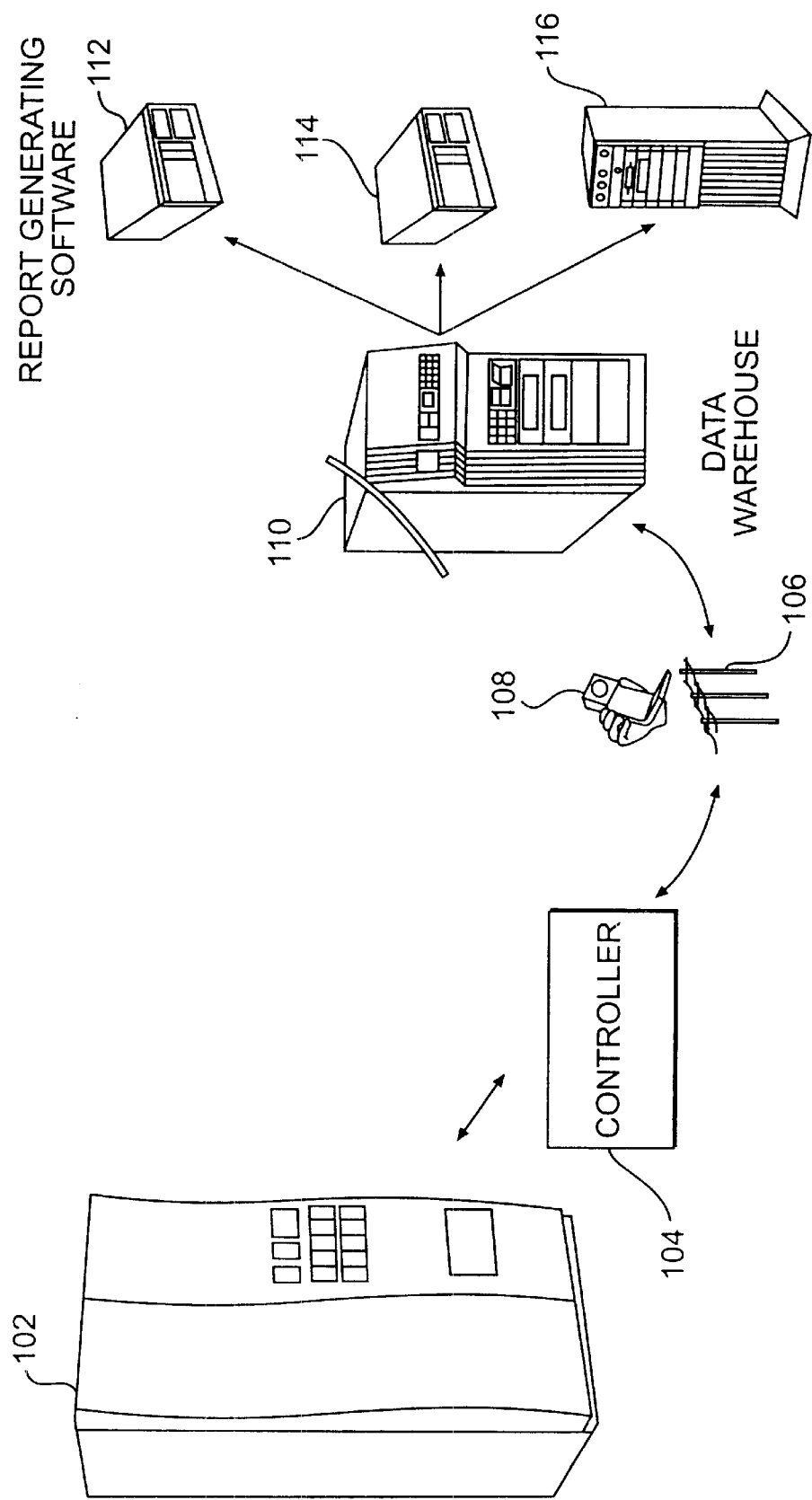
FIG. 1 depicts the prior art Harvest System.
Figure 2:
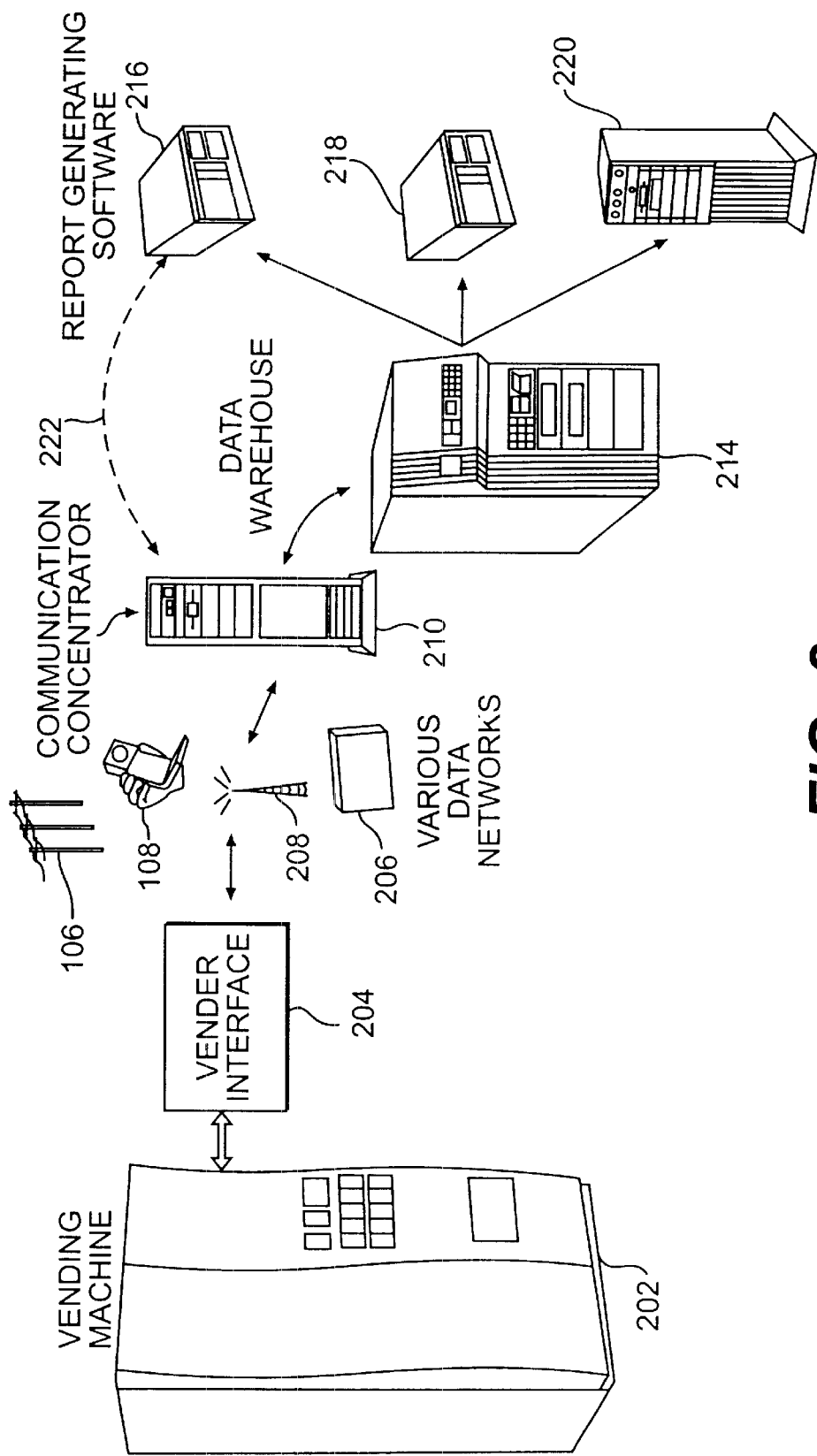
FIG. 2 depicts a wide area network-based system according to the invention.

FIG. 2 depicts the system according to the invention, which includes: a plurality of vending machines 202 (one of which is depicted for simplicity); a plurality of vendor interfaces corresponding in number to the number of vending machines 202 (one of which is depicted for simplicity; that one also being depicted outside the vending machine, though it is preferably located within the vending machine); a public switched telephone network (PSTN) 106; a circuit-switched cellular network (CSCN) 108; a wireless (preferably, but not necessarily, data-packet-based) data network 206; various other radio-based data communication technologies 208; a communications concentrator 210; a data warehouse 214; and bottlers' computers 216, 218, and 220 (only three being depicted for simplicity).

Again, one or more bottlers can own one hundred thousand vending-machines 202, or more.

Figure 3:
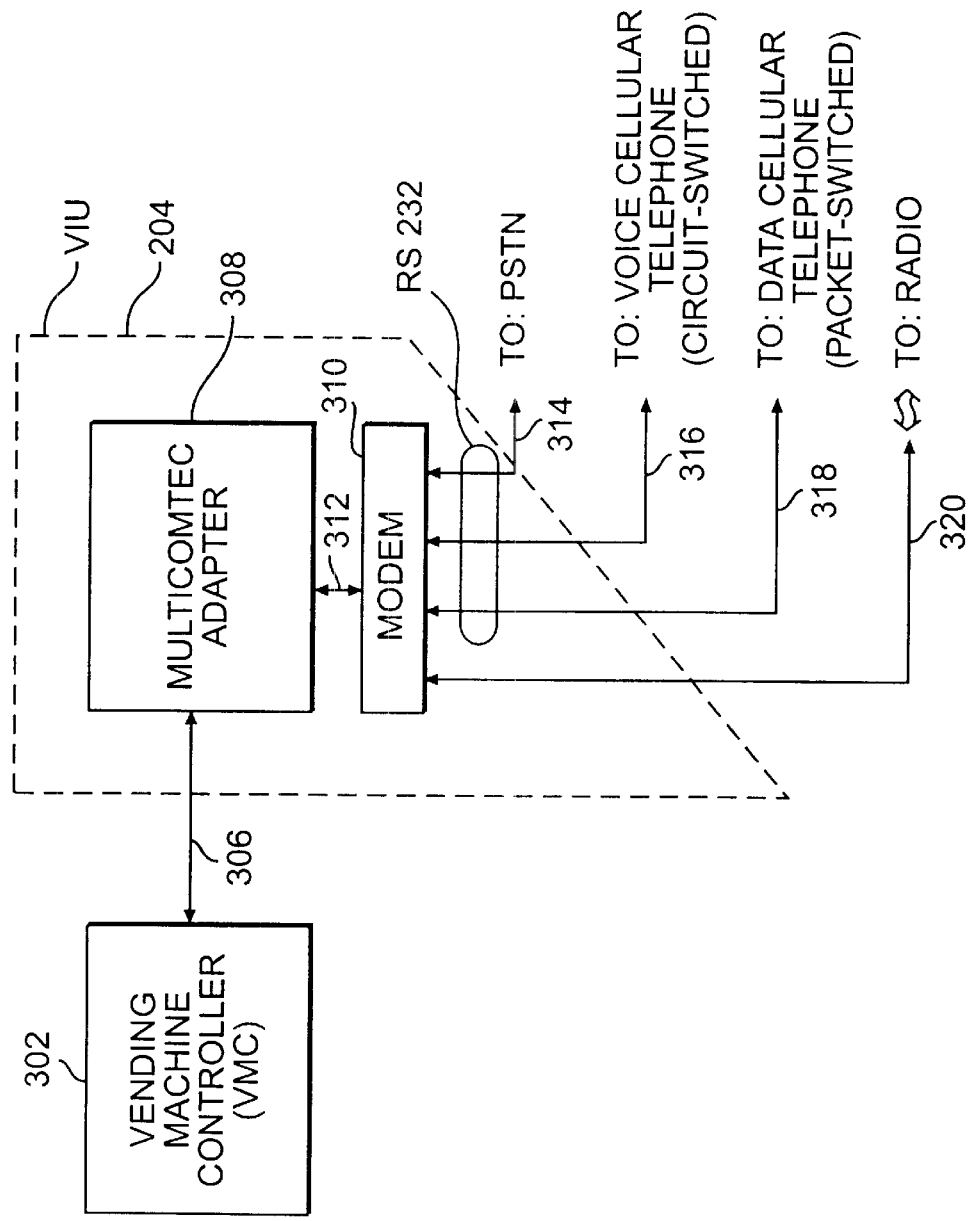
FIG. 3 depicts a communication system according to the invention, which can be found in a vending machine according to the invention.

FIG. 3 depicts the communication system in a vending machine according to the invention. FIG. 3 includes the vendor interface unit (VIU) 204, connected to a vending machine controller (VMC) (e.g., an Intel 8051 microprocessor or Motorola 68HC11 microprocessor), 302 and to the various communication technologies 106, 108, 206 and 208. More particularly, the VIU 204 includes a multiple-communication-technology adapter 308 that is connected to the VMC 302 via a Direct Exchange (DEX)/Uniform Communication Standard (UCS) connection 306 or, alternatively, a multidrop bus (MDB). A modem 310 connects the adapter 308, via a signal path 312, to perferably one of the communication technologies 106, 108, 206 or 208 via one of the signal paths 314, 316, 318 and 320, respectively. In other words, the adapter 308 is preferably configured to have one port to which one of the communication technologies is connected. Alternatively, the adapter 308 could be configured to have multiple ports, but this is more expensive and thus less desirable in the especially cost-sensitive vending machine art.

The adapter 308 adapts or interfaces. the VMC 302 to the communication protocols of the various technologies 106, 108, 206 or 208 to which a connection is made via the modem 310. The communication concentrator 210 can communicate via each of the depicted networks 106, 108, 206 and 208. The VIU 204 can communicate via at least two of the communication technologies. For example, the VIU 204 might be compatible with both the circuit-switched cellular telephone technology 108 and the wireless data network -technology 206. The adapter 308 automatically conforms to the circuit-switched cellular telephone technology 108 or the wireless data network technology 206 upon e.g., the receipt of a Hayes-type AT-command or other sequence (which identifies the particular communication technology) from a terminal or transceiver adhering to one or the other technology.

The communication concentrator 210 (e.g., a stand-alone processor or network server) provides the necessary protocol and handshaking to communicate with, and to collect the data from, the plurality of vending machines 202, as transmitted thereto via the various disparate communication technologies 106, 108, 206 and 208, and provides this data to the data warehouse 214. The communication concentrator 210 is typically provided by a third party, relative to the bottler.

The data warehouse 214 builds a database of this vending-related data. Preferably, the data warehouse is organized using a data structure that optimizes accessibility for the bottler, as will be discussed below in terms of FIGS. 4A and 4B.

The bottler preferably has its own computer 216, 218 or 220 running analysis software that optimally schedules service calls to the various vending machines and monitors emergency events in the vending machines. An example of an emergency event is a component failure or a completely or nearly completely depleted one of the inventories of soft drinks and/or coin denominations.

The bottler's computer 216, 218 or 220 remotely connects to the data warehouse 214. This frees the bottler from the capital expense of maintaining a large and failure-resistant database. Alternatively, the bottler could combine the data warehouse into its analysis computer and connect directly, albeit remotely, to the communication concentrator 210 (a path depicted with a dashed line 222 in FIG. 2).

An advantage of separating the data warehouse 214 from the bottler's computer 216, 218 or 220 is that the data warehouse 214 can be used to build databases for several bottlers. The data warehouse 214 would have the responsibility of establishing confidentiality measures (or firewalls) to preserve the proprietary nature of the data. By having the data warehouse 214 serve multiple bottlers, the cost of the data warehouse 214 for each bottler is decreased significantly.

The system of FIG. 2 is also bi-directional. The bottlers can use the network to, e.g., update the software in the controller 302 of the vending machine 102 and/or adaptively change the prices of the soft drinks via the communications concentrator 214.

In FIG. 3, the modem 310 is connected to one of PSTN 106, a CSCN 108, a wireless data network 206, the radio-based technology 208 or to an infrared (IR) hand-held-type transceiver (not shown). The adapter 308 automatically recognizes the communication technology to which the modem 310 is connected upon receipt of a Hayes-type AT-command or other sequence indicative of the particular communication technology. The adapter 308 then drives the modem 310 according to the technology that has been recognized.

A critical consideration for the soft drink vending industry is that the margin of profit is very small. Thus, the cost of hardware in the vending machine must be minimized. Moreover, the communication interface in a vending machine must be flexible so that it can adapt at minimal expense to what is currently the least expensive communication technology.

In the USA, the most common communication technology is the PSTN 106. However, while communication over an existing land line is relatively inexpensive, it can be expensive to install a line to the vending machine, especially if the machine is located in a remote area or is situated such that it is difficult to route a telephone line thereto.

Circuit-switched cellular network (CSCN) technology 108, typically voice cellular technology such as the Global System for Mobile Communications (GCM) or the Advanced Mobile. Phone System (AMPS), is also common in the heavily populated portions of the USA. The infrastructure needed to connect an individual vending machine to a cellular network is generally less substantial than a PSTN because it is merely necessary to connect a cellular phone to the vending machine 202. However, it can be expensive to communicate data via a circuit-switched cellular telephone network 106.

Generally, a communications subscriber is charged a fee each time a circuit-switched cellular connection is made. That fee includes a minimum connection time whether or not the actual duration of the call equals that minimal connection time. The invention is, in part, a recognition that the duration of a typical data transmission from a vending machine 202 to the communications concentrator 210 tends to be significantly less than the minimum connection time typically charged by a CSCN provider. Moreover, the connection charge for a cellular network, especially a voice cellular network, varies significantly depending upon the time of the day during which the connection is made. For circuit-switched cellular technology, peak usage hours command a higher connection charge. While regularly scheduled connections between a vending machine and the communication concentrator can be scheduled for off-peak hours, an emergency connection, such as in a device failure or inventory depletion alert, cannot be restricted to off-peak hours.

An increasingly prevalent alternative to the circuit-switched cellular voice telephone technology is the wireless data technology 206. Most, but not all of these technologies, are data-packet-based. Examples of such networks include the RAM mobile data technology, the ARDIS technology, the SMR technology and the cellular digital packet data (CDPD) technology. Such wireless data technologies typically base their pricing upon the total number of kilobytes transmitted during a connection, rather than the total length of the connection.

The invention makes it possible to adaptively change the communication technology used by a vending machine 202 at very low cost. During a refill or emergency service visit, a technician can connect a cellular phone or radio to the MODEM 310, or directly connect the MODEM 310 to a land line. This is a simpler procedure than replacing a single-use adapter to match the currently-preferred communication technology.

Figure 4A:
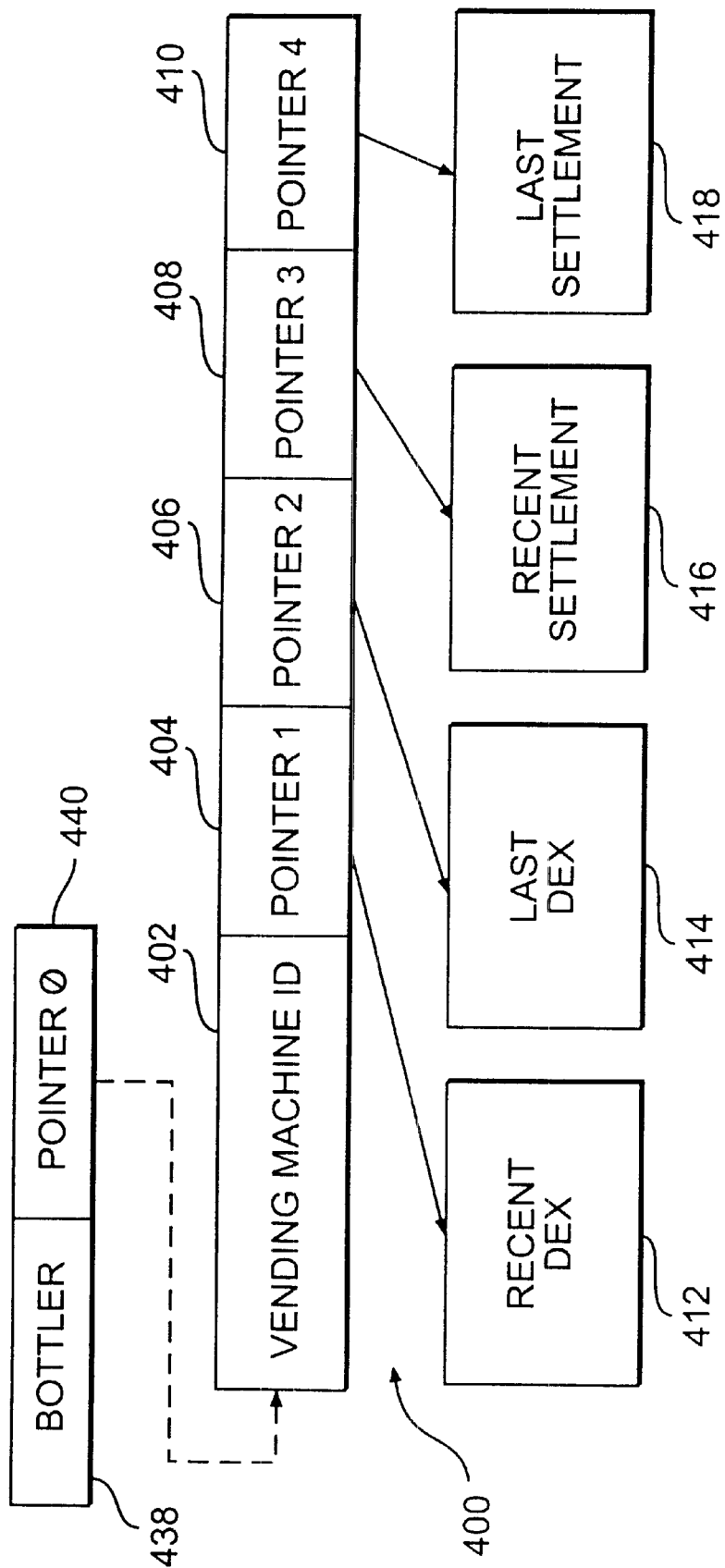
FIGS. 4A and 4B depict alternate data structures for a database according to the invention.
Figure 4B:
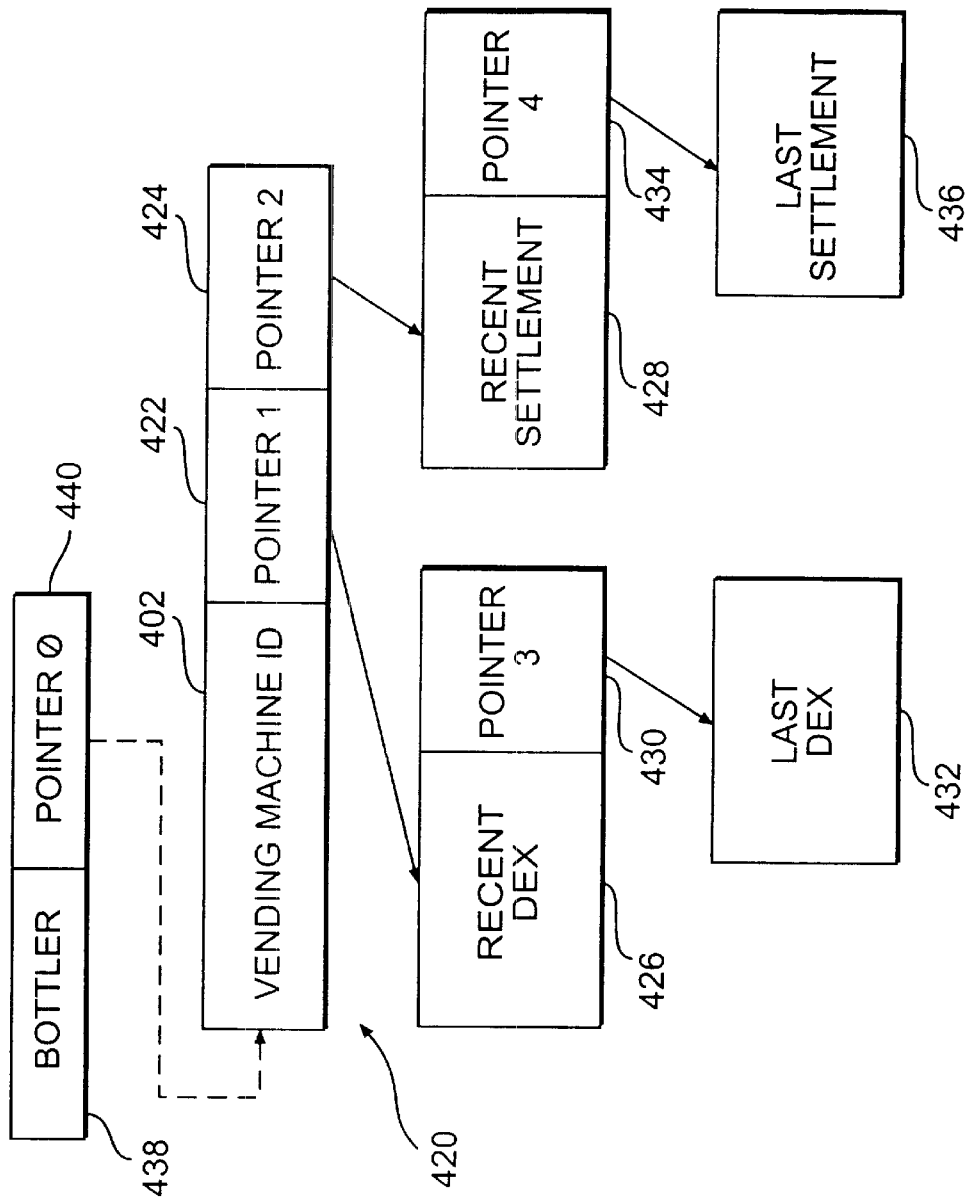

FIGS. 4A and 4B depict example data structures that can be used in the memory of the data warehouse to associate related vending machine information, i.e., to build the database and to optimize accessibility of the vending machine-related data for the bottler's analysis computer.

FIG. 4A depicts a linked list 400 that includes a first data element 402 for storing the identification (ID) of a vending machine. Associated with the vending machine ID data element 402 are four pointers 404, 406, 408 and 410 which point to a first data element 412 representing a most recent set of prediction information for the vending machine (e.g., in the DEX format), a second data element 414 representing a next most recent set of prediction information (e.g., in the DEX format), a third data element 416 representing a most recent set of refill-visit information, and a fourth data element 418 representing a next most recent set of refill-visit information, respectively.

FIG. 4B depicts an alternative, and more preferred, data structure 420 that has the same first element 402 for storing a vending machine ID. Associated with the vending machine ID data element 402 are two pointers 422 and 424 which point to data elements 426 and 428, respectively. The data elements 426 and 428 of FIG. 4B correspond to the data elements 412 and 418, respectively, of FIG. 4A. The data element 426 has a pointer 430 pointing to a data element 432. The data element 428 has a pointer 434 pointing to the data element 436. The data elements 432 and 436 of FIG. 4B correspond to the data elements 414 and 418, respectively, of FIG. 4A.

The data structures of FIGS. 4A and 4B each can optionally and preferably include an association with a data element 438 for storing an identification of a bottler, e.g., via a pointer 440 pointing from the bottler ID data element 438 to the vending machine ID data element 402. The pointer path from the bottler ID data element 438 to the vending machine data element is depicted with a dashed line to emphasize that this is an optional aspect of the data structure 402 or 420. Where the data warehouse 214 stores data for computers belonging to more than one bottler, this additional associated data element 438. However, where the data warehouse 214 stores the data of only one bottler, the bottler ID data element 438 is unnecessary.

Figure 4C:
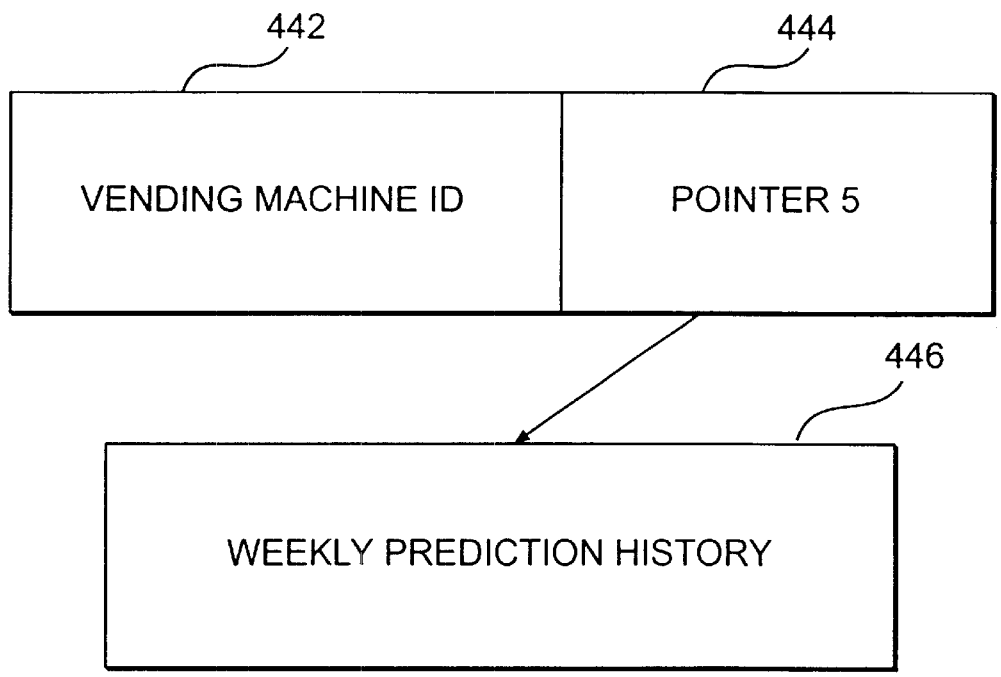
FIGS. 4C and 4D depict additional aspects of the data structures of FIGS. 4A and 4B.

FIG. 4C depicts an additional aspect of a data structure according to the invention. In FIG. 4C, a data element 442, which corresponds to the data element 402, is associated with a data element 446, e.g., via a pointer 444. The data element 446 represents at least one set of weekly historical prediction information for the vending machine identified by the data element 442. Preferably, but not necessarily, the data element 442 will have one to four such sets of weekly historical information, i.e., up to one month's worth of such information.

Figure 4D:
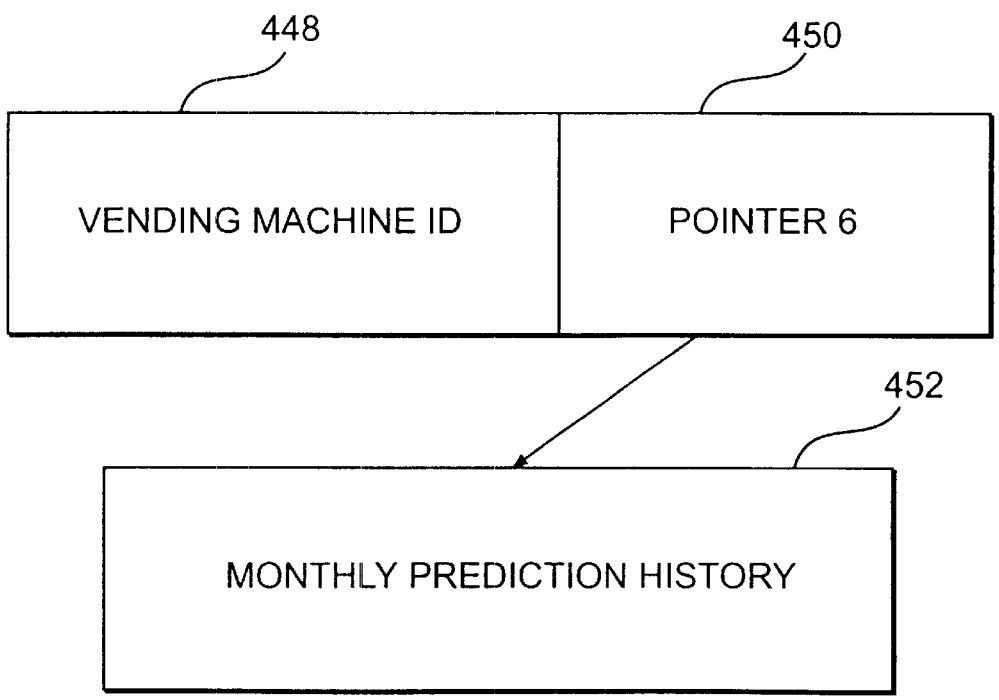

FIG. 4D depicts yet another aspect of a data structure according to the invention. In FIG. 4C, a data element 448, which corresponds to the data element 402, is associated with a data element 452, e.g., via a pointer 450. The data element 452 represents at least one set of monthly historical prediction information for the vending machine identified by the data element 448. Preferably, but not necessarily, the data element 452 will have one to twelve such sets of monthly historical information, i.e., up to one year's worth of such information FIGS. 5A–5E depict various on-line scenarios for an embodiment of the on-line vending system according to the invention.

Figure 5A:
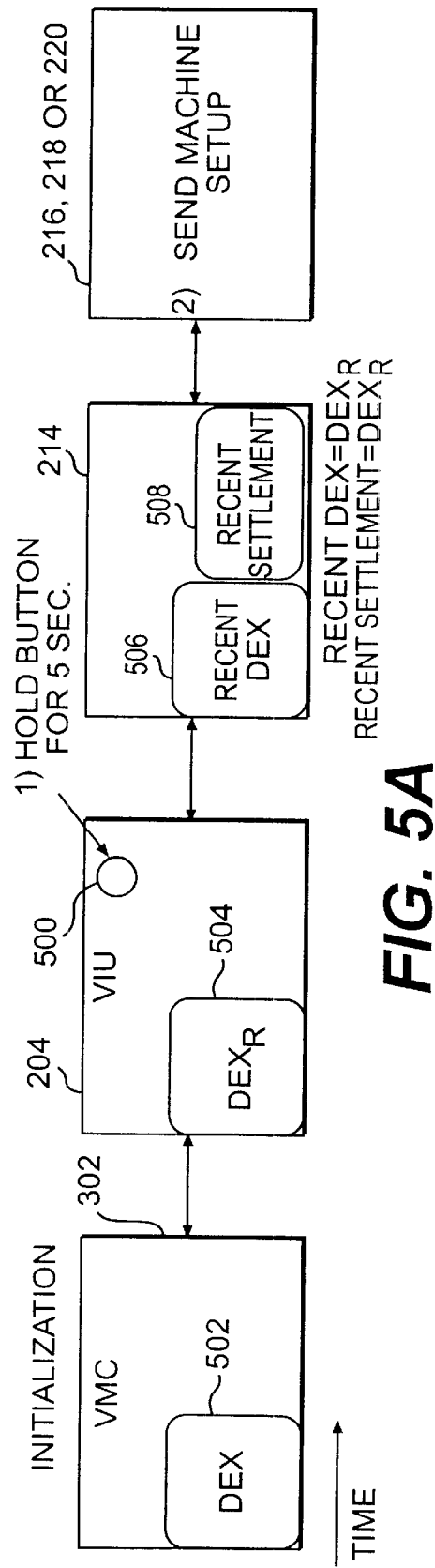
FIGS. 5A–5E depict on-line data transmission scenarios according to the invention.

In FIG. 5A, the initialization scenario is depicted. In response to a button 500, e.g., on the VIU 204, being depressed for 5 or more seconds, the VIU 204 requests and retrieves a file of vending-related data for the vending machine 202 from the VMC 302. Preferably, the data file is configured according to the direct exchange data format (DEX) that is well known in the vending industry. Alternativley, the MDB technology could be used in place of the DEX technology. The VMC 302 transfers this DEX file to the VIU 204 which adds information to the file that identifies (ID information) the machine 202. The VIU 204 labels the most-recently received DEX file as a $DEX_R$ file 504, i.e., a recent DEX file, and then transmits the $DEX_R$ file 504 to the data warehouse 214. The data warehouse 214 stores the $DEX_R$ file 504 as a recent DEX file and defines a recent settlement file as being equal to the $DEX_R$ file 504. The data warehouse 214 notifies the bottler's computer 216, 218 or 220. In response the bottler's computer 216, 218 or 220 optionally sends setup parameters to the VMC 302 via the data warehouse 214, one of the various communication technologies and the VIU 204.

Figure 5B:
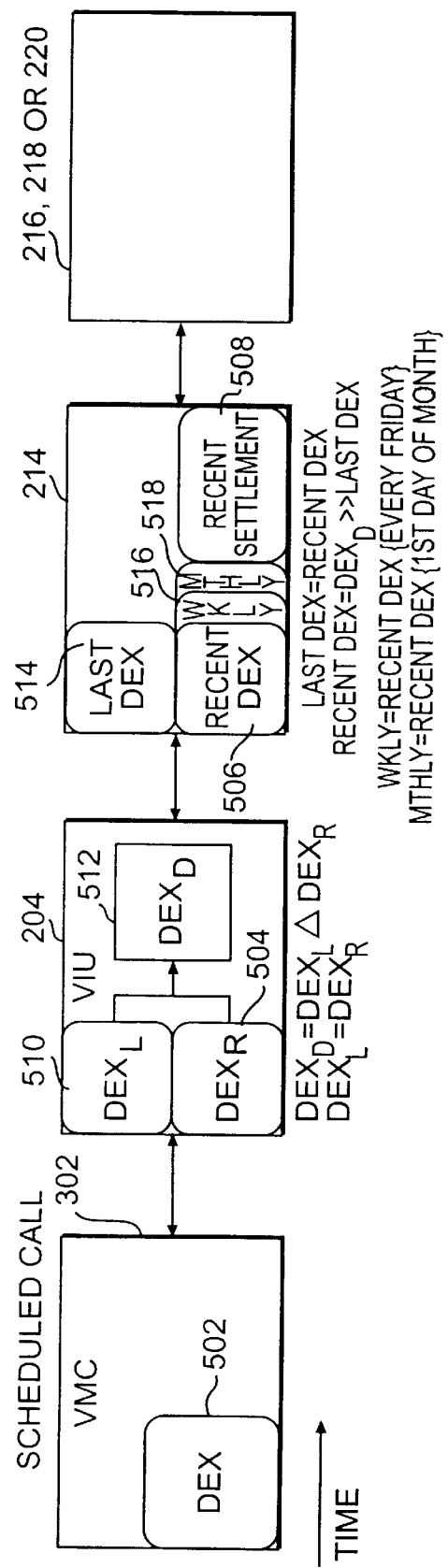

FIG. 5B depicts the scheduled call scenario. Just prior to a predetermined time, e.g., midnight, the VIU 204 prepares a DEX data file in anticipation of initiating a call at the predetermined time to the data warehouse 214. The VIU 204 labels the $DEX_R$ file 504 as the $DEX_L$ file 510, i.e., to denote the previous or last DEX file. Upon receipt of the DEX file 502 from the VMC 302, the VIU 204 adds the machine ID information and labels the augmented file as the $DEX_R$ file 504. Then, the VIU 204 prepares a partial DEX file 512, namely $DEX_D$, by comparing the $DEX_L$ and the $DEX_R$ files 510 and 504 and saving any record therein that contains a field that has changed. Only the changed fields are included. The VIU 204 transmits the $DEX_D$ file 512 to the data warehouse 214. This difference (or delta) system minimizes the amount of data transmitted to the data warehouse 214, making this technique well suited to the wireless data network technology.

In FIG. 5B, the data warehouse 214 relabels the recent DEX file 506 as the last DEX file 514 when it polls the VMC 302. Upon receipt of the $DEX_D$ file 512 the data warehouse 214 reconstructs a full recent DEX file 506 based upon the $DEX_D$ file 512. In addition, the data warehouse 214 builds a weekly file 516 and a monthly file 518 that are formed of a sequence of files received, e.g., every Friday and every first day of the month, respectively. In FIG. 5B, the data in the data warehouse 214 continues to be available to the bottler's computer 216, 218 or 220.

The data produced by a scheduled call is referred to as predictive information because it is obtained at regular intervals and is used for making refill-routing decisions. Between the scheduled call and a subsequent refill visit, the vending machine might experience additional sales that will cause the prediction data to vary from the actual refill-visit data. Both the prediction data and the refill-visit data-contain product and currency inventory information.

Figures 5C, 5D, 5E:
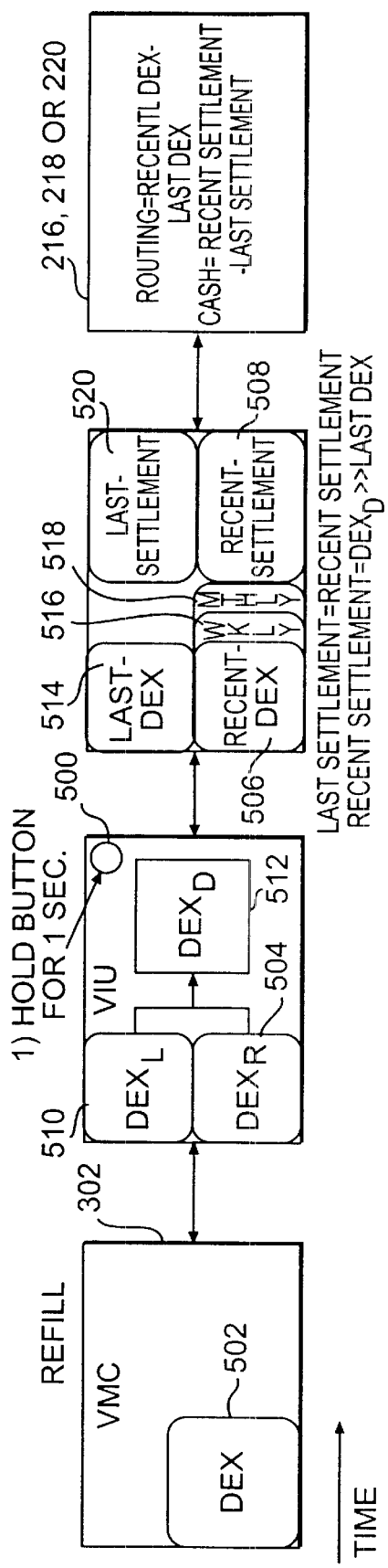

FIG. 5C depicts the refill-visit scenario. In this scenario, the technician has opened the vending machine 202 and has restocked the inventories of soft drinks and coinage. Upon the technician depressing the button 500 on the VIU 204 for 0.3 seconds or more, but less than five seconds, e.g., one second, the VIU 204 requests a DEX file from the VMC 302 which the VMC 302 provides. As before, the VIU 204 relabels the old $DEX_R$ file 504 as a $DEX_L$ file 510 in response to requesting a new DEX file from the VMC 302. The new DEX file is augmented with machine ID information and labeled $DEX_R$ upon receipt by the VIU 204. The VIU 204 then prepares a $DEX_D$ file 512 and transmits it to the data warehouse 214.

The data warehouse 214 responds to a refill report from the VMC 302 by labeling the old settlement file 508 as the last settlement file 520 and establishing a new recent settlement file 508. The new recent settlement file 508 is based upon the default parameters for the vending machine 202, which reflects the assumption that the technician has fully restocked the product and currency inventories in the vending machine 202 unless contrary information is supplied by the VIU 204. Alternatively, the recent settlement is based upon the recent DEX, i.e., the $DEX_D$ file 512.

In FIG. 5C, the bottler's computer 216, 218 or 220 accesses the data warehouse 214 to calculate routing information and cash information. Routing is calculated as follows: routing=recent DEX−last DEX. Cash is calculated as follows: cash=recent settlement−last settlement.

FIG. 5D depicts an alarm scenario. Among the information transmitted by the VIU 204 to the data warehouse 214 is an alarm parameter. If the alarm parameter is set to one, this indicates that a component has failed and/or one or more inventories has reached a predetermined minimum level or has become completely depleted. FIG. 5E is a table listing the total number of files preferably involved in the difference or delta embodiment according to the invention. FIG. 5E includes the four basic files, recent DEX, last DEX, recent settlement, and last settlement. In addition, FIG. 5E shows the weekly file and the monthly file which actually contains twelve files. Thus, a total of seventeen files are used in the delta embodiment.

Alternatively, it is not necessary to form delta or $DEX_D$ files. For example, where the communication technology bases billing upon a fixed connection charge having a set minimum connection time, it is unnecessary to minimize the size of the data transmission so long as the connection time does not exceed the set minimum time being charged. So if data quantity is not a primary concern, then full DEX files rather than delta DEX or $DEX_D$ files can be transmitted. As an alternative to forming the delta DEX or $DEX_D$ files, the full DEX files can be compressed using conventional technology. This variation on the technique is depicted in FIGS. 6A–6F.

FIGS. 6A–6F depict a various on-line scenarios for an alternative embodiment of the on-line vending system according to the invention which is adapted to communication technology for which billing is based upon a fixed connection charge having a set minimum connection time. FIGS. 6A–6D differ primarily from FIGS. 5A–5C by depicting full DEX files as being sent from the VIU 204 to the communications concentrator 214, rather than the $DEX_D$ file of, e.g., FIGS. 5B and C. Also, the DEX files being sent from the VIU 204 to the communications concentrator 214, in FIGS. 6A–6D, are optionally and preferably compressed.

Figure 7:
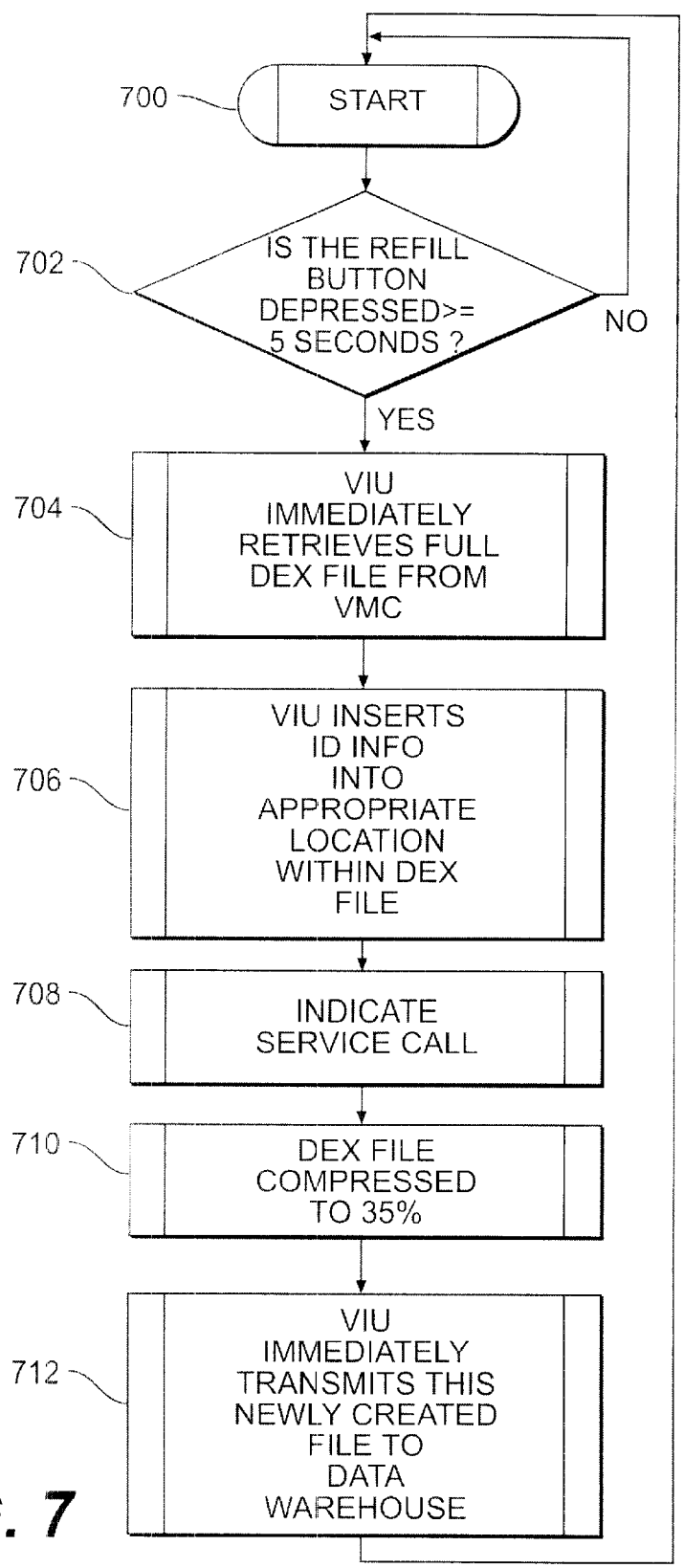
FIGS. 7–8 depict flow charts corresponding to the processing taking place in the vending interface unit for the scenarios of FIGS. 6A and 6B, respectively.

FIG. 7 depicts the processing done by the VIU 204 in FIG. 6A. Processing starts at step 700 and proceeds to a determination at step 702 of whether the refill button 500 has been depressed for five or more seconds. If not, flow returns to step 700. If so, flow proceeds to step 704, where the VIU 204 immediately retrieves a full DEX file from the VMC 302.

Flow proceeds in FIG. 7 from step 704 to 706, where the VIU 204 inserts identifying information, sufficient to uniquely identify the vending machine, into the DEX file. Flow proceeds from step 706 to 708, where the VIU 204 communicates with the data warehouse 214 via the communication concentrator 210. Among other things, the VIU 204 indicates that this call is a service call. Flow proceeds from step 708 to 710, where the VIU 204 optionally and preferably compresses the DEX file to, e.g., 35% of its original size. Flow proceeds from step 710 to 712, where the VIU 204 then transmits the compressed file to the data warehouse 214 via the communication concentrator 210. Flow proceeds from the step 712 back to the step 700.

If a refill procedure is being performed as in Fig. 5C, processing differs from FIG. 7 primarily at step 702. Instead of determining whether the refill button is depressed for five or more seconds, a determination is made whether the refill button 500 has been depressed for between, e.g., 0.3 seconds and 5 seconds. If so, this indicates a refill procedure.

Figure 8:
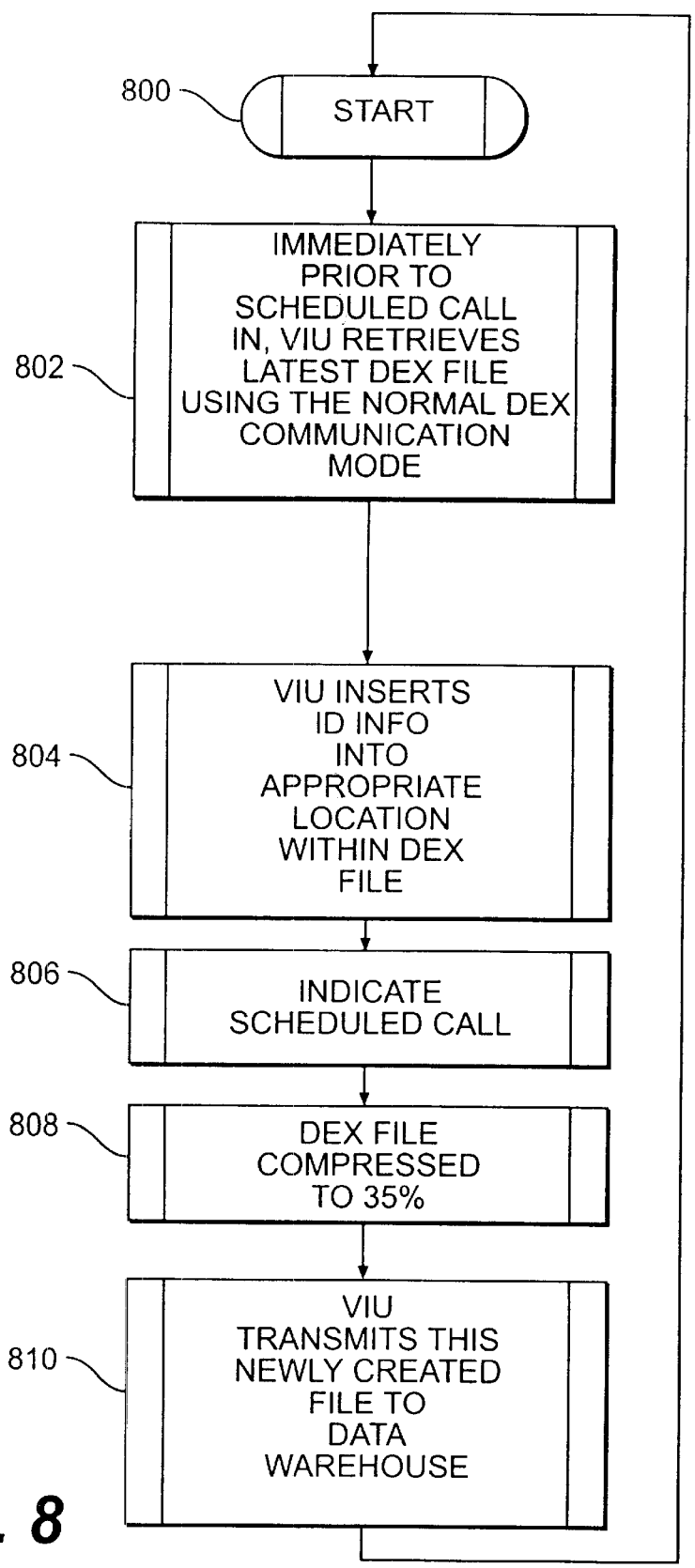

FIG. 8 depicts the processing that takes place in the VIU 204 during a regularly scheduled call by the VIU 204 to the data warehouse 214. The VIU 204 reports product and currency inventory information on the vending machine 202. Processing in FIG. 8 starts at step 800 and proceeds to 802, where a DEX file is retrieved from the VMC 302 by the VIU 204 immediately prior to the scheduled time for the call. Flow proceeds from step 802 to step 804, where the VIU 204 inserts identifying information into the DEX file, as in step 706 of FIG. 7.

Flow proceeds from step 804 to step 806, where the VIU 204 further configures the DEX file to indicate that this call is a scheduled call. Flow proceeds from step 806 to step 808, where the VIU 204 optionally and preferably compresses the DEX file to, e.g., 35% of its original size. Flow proceeds from step 808 to step 810, where the VIU 204 transmits the compressed data file to the data warehouse 214 via the communications concentrator 210. Steps 808 and 810 correspond to steps 710 and 712 of FIG. 7.

Returning to FIG. 6C, a $DEX_{Refill}$ file 604 and a $DEX_{Last}$ file 606 are depicted as being stored in the VIU 204. The same is depicted in FIG. 6D. The $DEX_{Refill}$ file 604 sets a baseline relative to which changes reflected in subsequent DEX files can be evaluated. The $DEX_{Refill}$ file 604 is stored until the next refill or service procedure, at which time it is replaced by a new $DEX_{Refill}$ file 604.

FIG. 6E lists the maximum number of files stored by the VIU 204 at any given time. These files include a current DEX file, a $DEX_{Last}$ file corresponding to the next most recent DEX file that was obtained and a $DEX_{Refill}$ file corresponding to a DEX file generated when the machine was most recently refilled.

In addition to compression using either the delta DEX ($DEX_D$) embodiment or conventional compression technology, the data being transmitted can be encrypted after it is compressed. This adds an extra measure of protection to preserve the proprietary nature of the data being transmitted.

The on-line vending system according to the invention is a distributed processing system. An alternative, i.e., non-distributed system could be realized using a sophisticated controller in the vending machine, connected to a centralized processing facility, that singularly performs the functions of the communication concentrator, the data warehouse, and the bottler's analysis computer. Such a non-distributed system is extremely impractical in the soft drink vending industry where profit margins are so small that investment in the sophisticated technology necessary to achieve a non-distributed system is prohibitively expensive.

The invention is downwardly compatible to electromechanical vending machines not equipped with data collection capability. It is within the ordinary level of skill in the art to adapt an electromechanical machine to have data collection capability.

Each DEX file is approximately between 2 and 4.5 kilobytes. Each vending machine preferably calls in at least once a day, which yields at least 365 files from each vending machine per year. If a bottler has 1,000 vending machines, then this represents between 750 megabytes and 1.65 gigabytes of DEX files per year. Moreover, this Figure does not include the settlement files, weekly files, and monthly files associated therewith. It is a large quantity of data which must be transferred as inexpensively as possible because of the tight profit margins in the soft drink vending industry; the invention has the advantage of making this possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vending machine, a vending machine communication system comprising:
   a vending machine data acquisition unit to at least one of collect and receive vending-related data concerning said vending machine;
   a multiple-communication-technology adapter to interface said data acquisition unit to a plurality of diverse communication technologies including at least a first wireless technology, said adapter being selectively responsive to a command signal indicative of the communication technology to be interfaced, said command signal being a handshake signal from the communication signal carrying the data from the vending machine; and a modem connected through a single data path to said adapter and to one of said plurality of diverse communication technologies in response to said handshake signal.

2. The system of claim 1, wherein said first wireless technology is cellular telephone technology.

3. The system of claim 1, wherein said plurality of communication technologies includes a second wireless technology.

4. The system of claim 3, wherein said first cellular telephone technology is circuit-switched cellular telephony and said second wireless technology is wireless data technology.

5. The system of claim 3, wherein said second wireless technology includes one of RAM Mobile Data, ARDIS, SMR and CDPD.

6. The system of claim 1, wherein said plurality of communication technologies includes one of a public switched telephone network (PSTN) technology and an infrared (IR) data transfer technology.

7. The system of claim 1, further including a dedicated terminal unit of one of said plurality of communication technologies, said dedicated terminal unit being operable to connect said modem to a network operating according to said one of said plurality of communication technologies.

8. The system of claim 7, wherein said dedicated terminal unit is one of a circuit-switched cellular telephone, a wireless data transceiver, a public switched telephone network (PSTN) landline and an infrared transceiver.

9. A vending machine monitoring system comprising:

a plurality of vending machines, each vending machine having a communication system that includes:
  a vending machine data acquisition unit for at least one of collecting and receiving vending-related data concerning said vending machine;
  a multiple-communication-technology adapter for interfacing said data acquisition unit to a plurality of diverse communication technologies including at least a first wireless technology, said adapter being selectively responsive to a command signal indicative of the communication technology to be interfaced, said command signal being a handshake signal from the communication signal carrying the data from the vending machine; and
  a dedicated terminal unit of one of a plurality of communication technologies, said dedicated terminal unit being operable to connect a modem through a single data path to said adaptor and to said one of said plurality of diverse communication technologies in response to said handshake signal;
a first network operating according to a first one of said plurality of communication technologies;
a second network operating according to a second one of said plurality of communication technologies;
a communications concentrator, connected to said first and second networks, for communicating with each said data acquisition unit via said modem adaptor and single data path and one of said first and second networks, respectively;
a data warehouse unit for building a database that includes data corresponding to each of said vending machines; and a data processor for analyzing said data stored in said database.

10. A system as in claim 9, wherein each vending machine includes a modem to connect said adapter to one of said plurality of communication technologies.

11. A memory and transmission system having data compaction capabilities for storing vending machine-related data, corresponding to a plurality of vending machines managed by a manager computer connected thereto through a communication path, that is to be managed for access by an application program being executed on a data processing system of said manager computer, the memory comprising:

a data structure stored in said memory, said data structure including information resident in a database used by said application program, said data structure including:
  a first data element for storing an identification of one of said vending machines;
  a second data element, associated with said first data element, for storing a most recent set of prediction information about said one of said vending machines;
  a third data element, associated with said first data element, for storing a next most recent set of prediction information about said one of said vending machines;
  a fourth data element, associated with said first data element, for storing a most recent set of refill-visit information for said one of said vending machines;
  a fifth data element, associated with said first data element, for storing a next most recent set of refill-visit information for said one of said vending machines;
  a comparator for determining difference data between the data stored in the second and third data elements, and difference data between the fourth and fifth data elements, said manager computer utilizing only the difference data to manage the plurality of vending machines; and
  a data transmitter for transmitting only the difference data along said communication path from the data elements to the manager computer;
  whereby the difference data represents compacted data from the respective data elements.

12. The system of claim 11, wherein said data structure is a linked list.

13. The system of claim 12, wherein said linked list further comprises:
  a first pointer for pointing from said first data element to said second data element;
  a second pointer for pointing from said first data element to said third data element;
  a third pointer for pointing from said first data element to said fourth third data element; and
  a fourth pointer for pointing from said first data element to said fifth data element.

14. The system of claim 12, wherein said linked list further comprises:
  a first pointer for pointing from said first data element to said second data element;
  a second pointer for pointing from said first data element to said third data element;
  a third pointer for pointer for pointing from said second data element to said fourth data element; and
  a fourth pointer for pointing from said third data element to said fifth data.

15. The system of claim 11, wherein said plurality of vending machines is managed by a plurality of managers, respectively, said data structure further comprising:

a sixth data element, associated with said first data element, for storing an identification of a manager.

16. The system of claim 11, further comprising a sixth data element, associated with said first data element, for storing at least one set of weekly prediction history information about said one of said vending machines.

17. The system of claim 11, further comprising a sixth data element, associated with said first data element, for storing at least one set of monthly prediction history information about said one of said vending machines.

18. A vending machine monitoring system comprising:

a plurality of vending machines;

a wide area network for connecting said plurality of vending machines to a communications concentrator;

said communications concentrator for communicating with each of said plurality of vending machines, respectively, and a data warehouse unit; and said data warehouse unit for building a database that containing data corresponding to each of said vending machines, said database having a data structure that includes:

a first data element for storing an identification of one of said vending machines;

a second data element, associated with said first data element, for storing a most recent set of prediction information about said one of said vending machines;

a third data element, associated with said first data element, for storing a next most recent set of prediction information about said one of said vending machines;

a fourth data element, associated with said first data element, for storing a most recent set of refill-visit information for said one of said vending machines;

a fifth data element, associated with said first data element, for storing a next most recent set of refill-visit information for said one of said vending machines;

a comparator for determining difference data between the second and third data elements, and the fourth and fifth data elements;

means for routing only the difference data through said communication concentrator between the vending machines and the data warehouse; and whereby the amount of data routed is compacted as compared to the amount of data stored in the respective data elements.

19. The memory of claim 18, wherein said data structure is a linked list.

20. The memory of claim 19, wherein said linked list further comprises:

a first pointer for pointing from said first data element to said second data element;

a second pointer for pointing from said first data element to said third data element;

a third pointer for pointing from said first data element to said fourth third data element; and a fourth pointer for pointing from said first data element to said fifth data element.

21. The memory of claim 20, wherein said linked list further comprises:

a first pointer for pointing from said first data element to said second data element;

a second pointer for pointing from said first data element to said third data element;

a third pointer for pointing from said second data element to said fourth data element; and a fourth pointer for pointing from said third data element to said fifth data element.

22. The memory of claim 19, wherein said plurality of vending machines is managed by a plurality of managers, respectively, said data structure further comprising:

a sixth data element, linked to said first data element, for storing an identification of a manager.

23. The memory of claim 22, wherein said plurality of vending machines is managed by a plurality of managers, respectively, said data structure further comprising:

a sixth data element, linked to said first data element, for storing an identification of a manager.

* * * * *

UNITED STATES PATENT AND TRADEMARK OFFICE
CERTIFICATE OF CORRECTION

PATENT NO. : 6,462,644 B1
DATED : October 8, 2002
INVENTOR(S) : Thomas P. Howell and Kevin Ward It is certified that error appears in the above-identified patent and that said Letters Patent is hereby corrected as shown below:

Column 12,
Line 52, after "fourth" delete "third".
Line 61, after "third pointer" delete "for pointer".

Column 14,
Line 16, after "fourth" delete "third".
Lines 36-40, delete claim 23 in its entirety.

Signed and Sealed this

Eleventh Day of February, 2003

JAMES E. ROGAN
*Director of the United States Patent and Trademark Office*